United States Patent [19]
Galand et al.

[11] Patent Number: 4,677,671
[45] Date of Patent: Jun. 30, 1987

[54] METHOD AND DEVICE FOR CODING A VOICE SIGNAL

[75] Inventors: Claude Galand, Cagnes-Sur-Mer; Khamphuc Daulasim, Draguignan, both of France

[73] Assignee: International Business Machines Corp., Armonk, N.Y.

[21] Appl. No.: 553,266

[22] Filed: Nov. 18, 1983

[30] Foreign Application Priority Data

Nov. 26, 1982 [EP] European Pat. Off. ........ 82430038.8

[51] Int. Cl.⁴ .............................................. G10L 5/00
[52] U.S. Cl. ...................................... 381/31; 375/122; 375/37
[58] Field of Search .................................. 381/29–40; 375/122, 27

[56] References Cited

U.S. PATENT DOCUMENTS

| | | | |
|---|---|---|---|
| 4,216,354 | 8/1980 | Esteban et al. | 381/31 |
| 4,491,953 | 1/1985 | Bellisio et al. | 375/27 |
| 4,569,075 | 2/1986 | Nussbaumer | 381/29 |

Primary Examiner—E. S. Matt Kemeny
Attorney, Agent, or Firm—John B. Frisone

[57] ABSTRACT

A voice signal coding method is provided for processing the residual base-band signal provided by a Voice Excited Predictive (VEPC) Coder. The residual signal is split over several sub-bands and the contents of each sub-band is dually coded by using a process including a simultaneous direct BCPCM and differential APC coding with dynamic assignment of the quantizing bits according to the relative sub-band contents, which simultaneous coding is followed by a dynamic choice of the sub-band coded output providing the lowest coding error.

11 Claims, 15 Drawing Figures

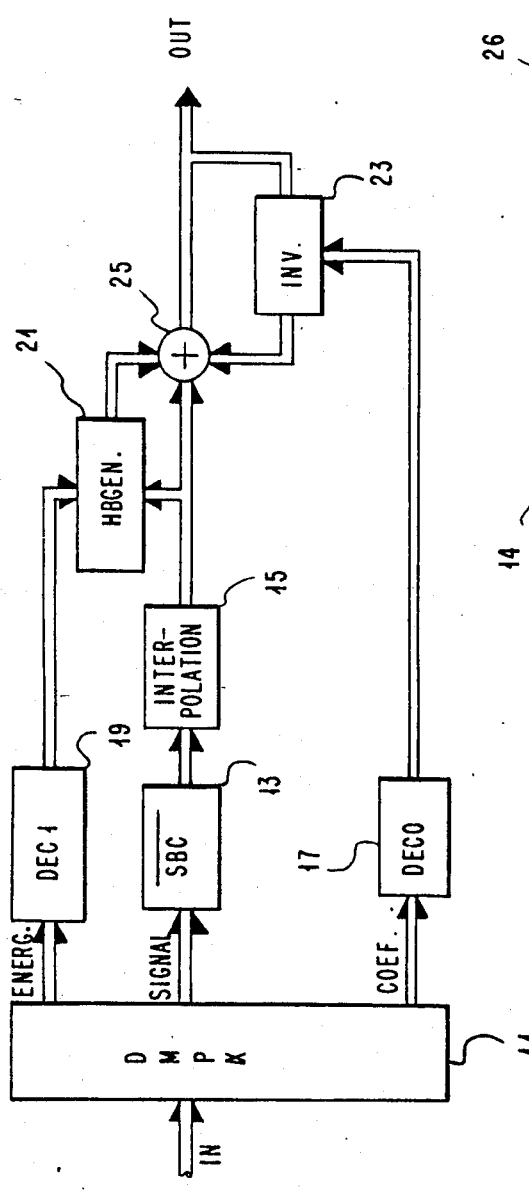
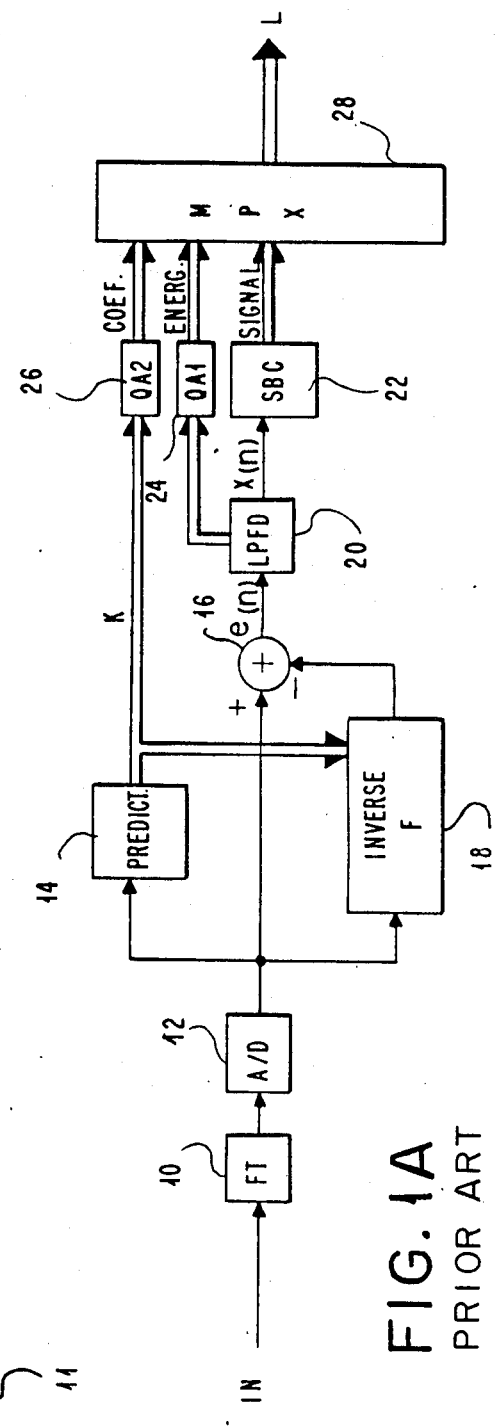
FIG. 1B
FIG. 1A
PRIOR ART

METHOD AND DEVICE FOR CODING A VOICE SIGNAL

BACKGROUND OF THE INVENTION

TECHNICAL FIELD

This invention relates to a method for coding a voice signal and more particularly, to a method for digitally encoding speech at relatively low bit rates.

PRIOR ART

The processing steps to be applied to a time varying signal for recording, transmitting or modifying said signal for the needs of the application, can be either analogically or digitally performed. In general, the execution of an analog process involves the use of cumbersome and expensive means. It is often preferred to apply a digital process although said digital process implies a preliminary conversion of the signal to be processed into a digital value. In order to perform this conversion, the signal is, first of all, sampled, then quantized, to be expressed into binary coded digital values. Of course, when the process is completed, this means that the signal is to be decoded to bring the information back into an analog value which can be understood by man. By coding and decoding modify the information by introducing noises, e.g. quantizing noise. Said noises can be reduced by performing the quantizing operation as accurately as possible. But when performing said quantizing operation, all (the samples the amplitude of which is comprised) having an amplitude between two consecutive amplitude levels (i.e., two amplitude levels separated by one bit quantity), appear as a same digital value. Of course, this leads to an inaccuracy in the transcription which becòmes more important as the number of the digital values usable for coding the signal becomes smaller. Therefore, it seems necessary to increase said number by using a higher coding bit rate in order to improve said coding. This is unfortunate since, in some cases, a traffic jam can be experienced in the channels provided for transmitting the bits, in the memories provided for storing said bits and/or in the circuits for processing said bits, which increases the cost of the corresponding equipment.

Various processes have been conceived for improving coding while reducing the required bit number or rate. To do so, the previously conventionally coded signal (which has been conventionally coded,) is re-coded at a lower bit rate. Then, it is said that the information is compressed. In addition, since the particular properties of the human voice are advantageously used in this case, these processes can be more particularly applied to voice compression.

Among the voice compression processes which are more particularly involved in this invention, the one described in U.S. Pat. No. 4,216,354 to the same assignee, filed Nov. 29, 1978 and herein incorporated by reference is to be noted. It should be noted that the original signal is, first of all, made redundancy free and provides a residual signal, the low frequency or base band of which is split into several subbands the contents of which are dynamically requantized.

A similar process is also described by D. ESTEBAN, C. GALAND, D. MAUDUIT and J. MENEZ in the "IEEE Proceedings of the International Conference on Acoustics Speech and Signal Processing", Tulsa, Okla., Apr. 10-23, 1978 under the title "9.6/7.2 Kbps Voice Excited Predictive Coder (VEPC).

One should also note U.S. patent application Ser. No. 399,385 filed July 19, 1982, now U.S. Pat. No. 4,569,075 and assigned to the same assignee. It is therein mentioned that an appropriate subdivision of the base band allows a signal showing an important correlation to be obtained in each sub-band said signal being therefore, encodable with a relatively low bit rate.

Another process providing a heavily correlated signal in each sub-band, has been described in a lecture given in Paris, ICASSP 1982, by C. GALAND, K. DAULASIM and D. ESTEBAN, and entitled "Adaptive Predictive Coding (APC) of Base-Band speech signals". The signal of each sub-band is coded by a predictive coder operating upon the residual base band signal. This process gives acceptable results provided that it is applied to relatively short voiced signal portions (smaller than 30 ms).

SUMMARY OF THE INVENTION

This invention substantially improves the qualities of the coding mode described in the ICASSP of 1982 and provides a coder allowing both voiced and unvoiced signals to be processed without formally determining whether the processed signal is voiced or unvoiced. Since one skilled in the art knows the difficulties encountered in practice for determining whether a voice signal is voiced or unvoiced, the various advantages of this invention will be fully appreciated. More accurately, an object of this invention is to provide a voice signal coding method in which said voice signal is, first of all, processed to derive a residual base-band signal therefrom, said residual signal being then split over several subbands and recorded in each sub-band by means of a process including: a simultaneous direct (e.g. PCM) and differential (e. g. APC) re-coding of the signal with a dynamic assignment of the quantizing bits, and the dynamic choice of the re-coder output involving the smallest re-coding error.

Specific features of the invention, as well as specific objects and advantages thereof, will become readily apparent from the following detailed description, taken in conjunction with the accompanying drawings.

BRIEF DESCRIPTION OF THE DRAWINGS

FIG. 1A illustrates a transmitter of the Prior Art using a Voice Excited Predictive coder (VEPC).

FIG. 1B illustrates the receiver to be associated with the transmitter of FIG. 1A.

DESCRIPTION OF THE PREFERRED EMBODIMENTS

Figure 2:
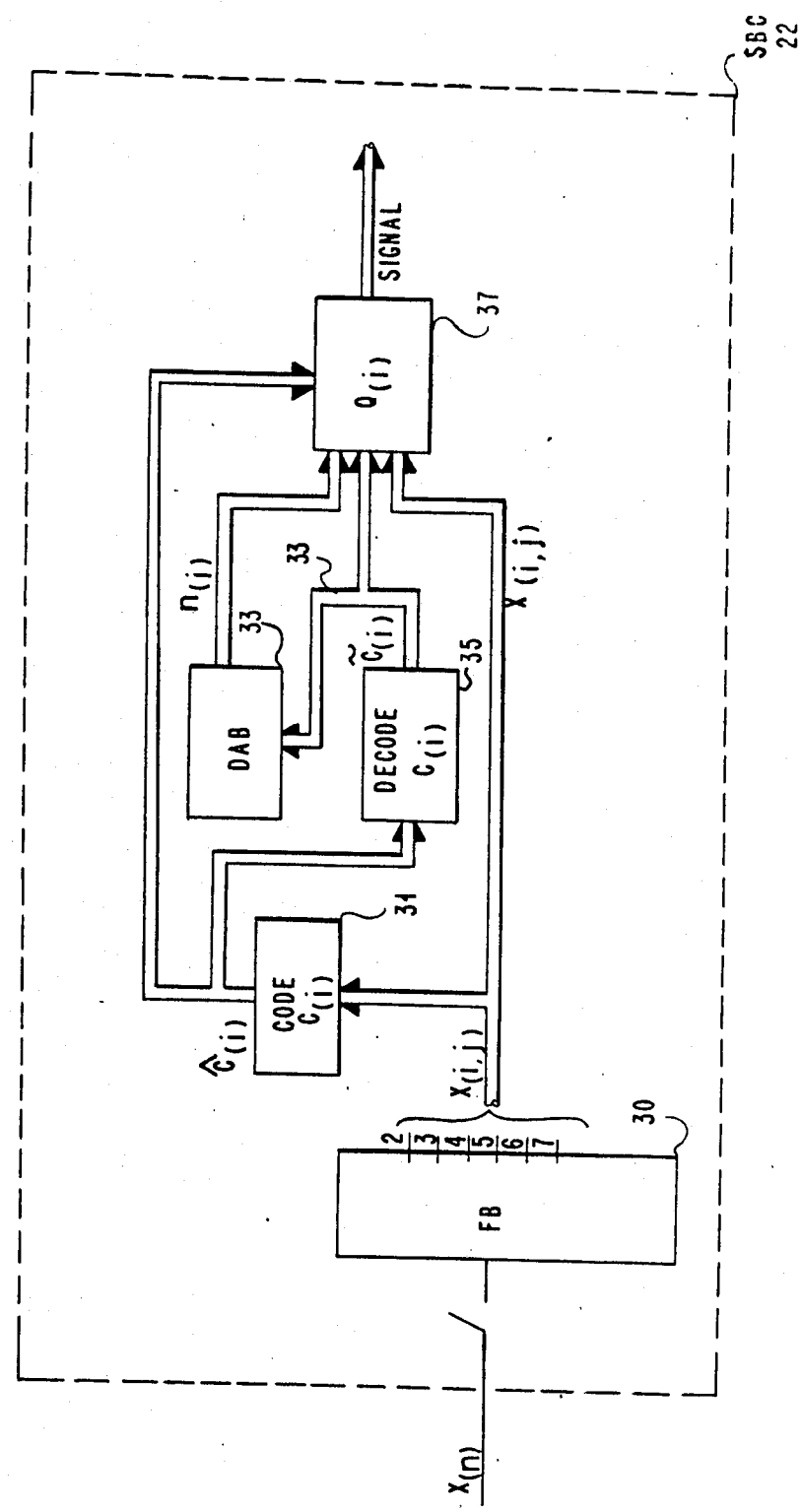
FIG. 2 is a block diagram of a portion of the coder shown on FIG. 1A, which is to be provided with the invention.

FIG. 1A shows a transmitter comprising a predictive coder (VEPC) of the type described in the above cited Prior Art and more particularly, in U.S. Pat. No. 4,216,354 as well as in the lecture given in Tulsa. Of course, some characteristics of the coder have been slightly modified in order to provide a high efficiency coding system.

The voice signal is applied to input IN of the coder. It is filtered through 10 by means of a low-pass filter (FT) transmitting a signal comprised within the so called "telephone" frequency band (frequencies $\geq 3400$ Hz) to an analog-digital converter (A/D) 12. In converter 12, the signal is sampled at 8 KHz and PCM coded with 12 bits. Then, the PCM coded samples are recoded. For this purpose, they are, first of all, sent into parameter predictor (PREDICT) 14, subtractor 16 and inverse filter (INVERSE F) 18. Predictor 14 deduces from the signal applied thereto, a group of so called partial autocorrelation of PARCOR (K) coefficients used for adjusting inverse filter 18. The inverse filter is similar to the lattice network defined by J. D. MARKEL et al in their book entitled "Linear Prediction of Speech", paragraph 5.4. The signal provided by inverse filter 18 represents the predictable portion of the voice signal. Subtractor 16 subtracts the signal delivered by inverse filter 18 from the signal provided by converter 12, provides a so called residual signal $e_{(n)}$ free of a portion of the original voice signal redundancy. Residual signal $e_{(n)}$ is filtered through a low pass filterdecimator (LPFD) 20. Device 20 provides, on the one hand, samples $X_{(n)}$ of a so called residual base band signal the spectrum of which is maintained within a frequency band of 300 to 1000 Hz for instance, and, on the other hand, information relating to the energy of the signal contained in the high frequency based suppressed by filter 20. The base-band residual signal is sub-band coded in a device (SBC) 22 which performs a requantizing operation with dynamic assignment of the quantizing bits and delivers a SIGNAL information. The energy of the residual signal high frequency band (1000–3400 Hz for instance) is requantized in 24 (QA1) to provide the ENERG (or E) information. As to the partial autocorrelation coefficients, also called PARCOR coefficients, they are requantized-recoded in 26 (QA2) to provide a COEF (or K) information. These three types of information, namely COEF (K), ENERG (E) and SIGNAL, constitute a coded representation fully characterizing the voice signal applied to input IN of the coder and are transmitted over a line L by means of a multiplexor 28.

First of all, it will be recalled that since the system operates in BCPCM (Block Companded Pulse Code Modulation) mode, the voice signal is processed by blocks of samples representing consecutive signal segments of 20 ms.

Parameter predictor device 14 has been more particularly described in details in U.S. Pat. No. 4,216,354 FIGS. 6 and 7. The method on which the device is based more particularly uses the algorithms proposed by J. LE ROUX and C. GUEGUEN in an article published by IEEE. Transactions on Acoustics, Speech and Signal Processing, June 1977.

Device 20 comprises a low-pass digital filter, the upper limit frequency of which is $\geq 1000$ Hz. Therefore, the base-band residual signal, represented by samples $X_{(n)}$, can be re-sampled at 2 KHz. This re-sampling is ensured in practice by performing a so called decimation operation which consists in periodically dropping some samples. Device 20 further comprises means for measuring energy (E) contained in the 1000–3400 Hz high frequency band suppressed by the low-pass filter of device 20. An embodiment of device 20 has been described in U.S. Pat. No. 4,216,354 (FIG. 2). In addition, it must be noted therein the provision of decimation means for reducing the signal sampling frequency to a value lower than the original one.

FIG. 1B represents the receiver which, located at the other end of line L, would reconstruct the original voice signal. A demultiplexor (DMPX) 11 processes the received information so as to separate components ENERG, SIGNAL and COEF from each other. The SIGNAL data are decoded in 13 ($\overline{SBC}$), then submitted to interpolation operations in 15 for bringing the signal sampling frequency back to its original value. In the same time, data COEF and ENERG are decoded in 17 (DEC0) and 19 (DEC1), respectively. The data outputted by interpolator 15 and the ones coded in 19 are used for reconstituting in 21 (HBGEN) the high frequency band which has been suppressed by filter 20. The coefficients provided by decoder 17 are used for tuning a filter 23 (INV) the output of which is added in 25 to the data provided by interpolator 15 and high band generator 21. Adder 25 provides the data which, after being converted into analog form (not shown), give a reproduction of the original uncompressed voice signal.

Figure 3:
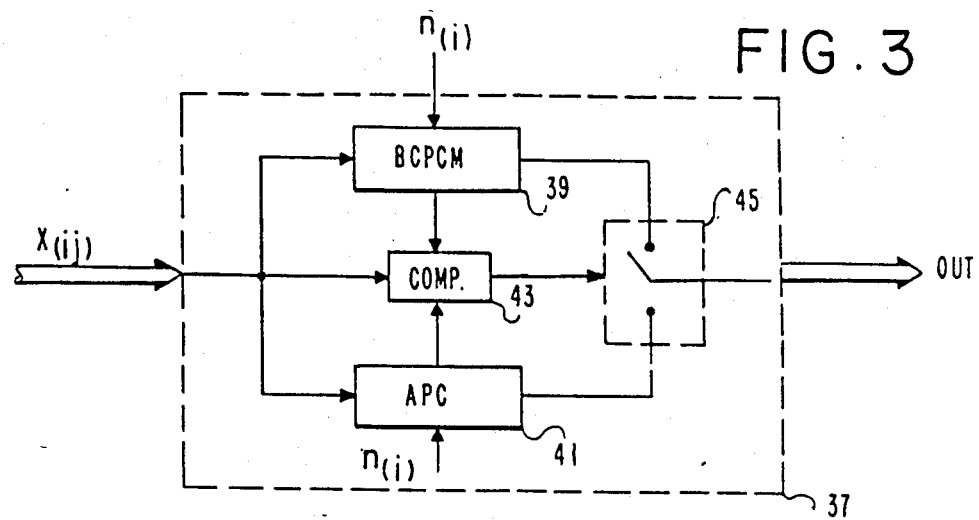
FIGS. 3 and 4 schematically show various embodiments of the invention.

FIG. 2 schematically shows sub-band coder 22 which is provided with filter set (FB) 30 which receives samples $X_{(n)}$. This filter set divides the pass band of the residual base-band signal into eight adjacent sub-bands 1–8. Only sub-bands 2 to 7 are kept for the needs of the invention. Filter set FB provides sub-band signals the samples of which are referenced $X_{(i,j)}$ where $i = 2, 3, \ldots, 7$ is the sub-band index and $j = 1, 2, \ldots, N$ defines the rank of the sample considered within a block of N samples. The samples of each sub-band are submitted to a characteristic term coder 31 which has two functions. Its first function consists in sorting the samples of each sub-band for deducing therefrom characteristic term $C_{(i)}$ as defined by BCPCM techniques. Stated another way:

$$C_{(i)} = \text{Max}(|X_{(i,j)}|) \qquad (1)$$

for $j = 1, 2, \ldots, N$ (Refer to the lecture given by A. CROISIER at the International Seminar on Digital Communications, Zurich 1974, under the title: "Progress in PCM Delta Modulation: Block Companded Coding of Speech Signal" (BCPCM). The second function of characteristic coder 31 consists in transcoding 12-bits terms $C_{(i)}$ into 4 bits by using a conversion table defined according to a logarithmic function. Transcoded terms $C_{(i)}$ are referenced $\check{C}_{(i)}$. The characteristic terms are processed by a dynamic bit allocating device (DAB) 33. In practice, device (DAB) 33 uses terms decoded in 35 and referenced $\check{C}_{(i)}$. Device 33 dynamically determines for each block of processed samples, the bit rate $n_{(i)}$ to be allocated for requantizing the $i^{th}$ sub-band samples, by using the following relation:

$$n_{(i)} = \frac{1}{p}\left[M - \sum_{j=2}^{7} \log_2 \tilde{C}_{(j)}\right] + \log_2 \tilde{C}_{(i)}$$

where M denotes the total number of bits to be distributed over the p=6 sub-bands. In fact, this relation generally gives non-integer values for $n_{(i)}$, which can also become negative. Therefore, these values must be adjusted by using a re-allocating algorithm as the one described in U.S. Pat. No. 4,216,354. Then, terms $X_{(i,j)}$ can be requantized in a more rational manner by device 37. For a better requantization, or more especially, for a better coding of terms $X_{(i,j)}$, in the present case, they are simultaneously processed in two coders as shown in FIG. 3. One of the coders, 39, is of the so called "direct" type (more especially of the BCPCM type) and requantizes the sub-band samples by applying the following relation:

$$\hat{X}_{(i,j)} = \left|\left|\frac{X_{(i,j)}}{\tilde{C}_{(i)}} \cdot 2^{n_{(i)} - 1}\right|\right| \qquad (2)$$

where
j=1, ..., N
i=2, ..., 7

$||\cdot||$ indicates that the term between the vertical bars is truncated to the lowest integer.

Second coder, 41, is of the differential type or more especially, in the present case, of the so called "APC" (Adaptive Predictive Coder) type. The outputs of coders 39 and 41 are continually inter-compared in 43. This comparison is used for choosing the coder on which output switch 45 is to be positioned.

By so operating, full advantage is being taken from the differences between voiced and unvoiced signals without being rigidly tied to such voiced/unvoiced qualification and, without having to effectively discriminate voiced signals from unvoiced signals. In effect, the gain provided by performing a second order predictive coding can be very important when the sub-band signals result from the analysis of a voiced sound. This gain is theoretically null when the sub-band signals are not very correlated as, for instance, in the case of unvoiced sounds. The prediction gain in a sub-band can also become very low when said sub-band contains a signal the frequency of which is close to one of its limit frequencies. In this case, the signal frequency after re-sampling (decimation) can be close to the Nyquist frequency and the re-sampled signal will show a low first order correlation. When the prediction gain becomes too low, the coding gain resulting from the use of a predictor with respect to a direct quantization (by BCPCM) of the signal can become negative. This is even more true when one uses a quantizer with a small number of bits (1 to 3, for instance). In this case, it is recommended to use direct coding. It will be seen later that it is possible to further improve the coding quality by reallocating to the directly processed sub-bands (by BCPCM) the quantizing bits allocated by dynamic allocation device 33 and not used by the sub-band coders operating in differential mode (APC).

A device (not shown) performing reverse operations with respect to the ones schematically shown on FIG. 3, will be, of course, necessary for reconstructing the original voice signal from the compressed signal according to the process of this invention.

Figure 4:
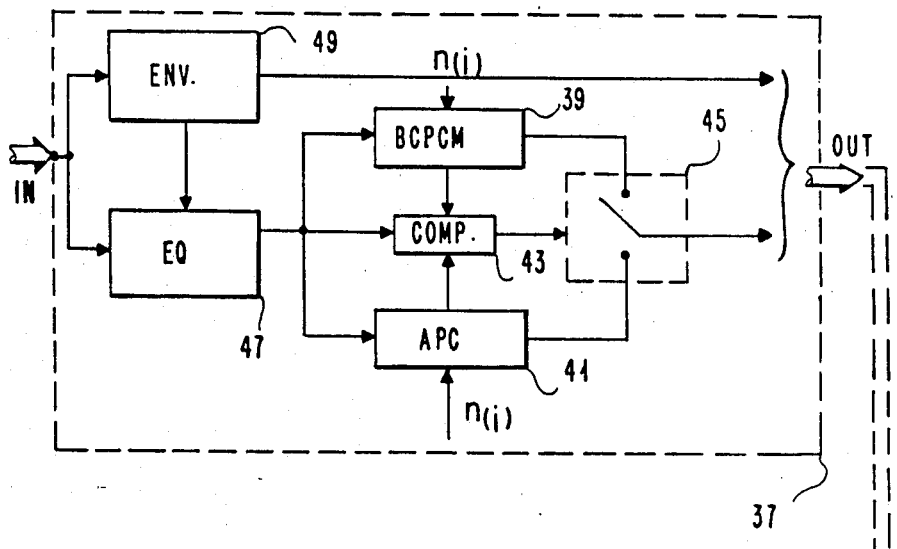
Figure 4:
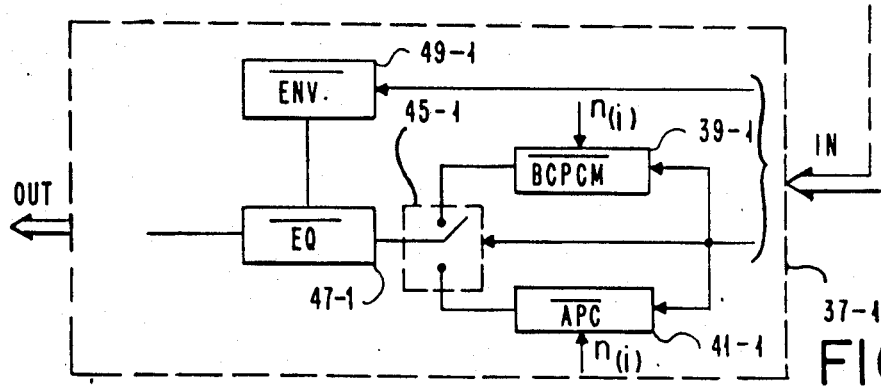

FIG. 4 also shows another embodiment of the coder of FIG. 3 and a device which, on decoding, would carry out reverse operations with respect to the ones performed in device 37. The difference between the coder of FIG. 3 and the one of FIG. 4 lies in the fact that, as to FIG. 4, before being processed in coders 39 and 41, the signal to be coded is amplitude-equalized (EQ) in 47 by using its envelope (ENV) determined by using device 49. In this way, differential coding efficiency is more particularly improved. For reconstructing the real signal, for instance at the receive end of a transmission line, then we would have not only decoders 39-1, 41-1 associated to switch 45-1, but also device 49-1 recalculating the signal envelope and allowing the signal to be modulated in 47-1. It should be noted that the bars placed on decoding, above the functional indications of the schema blocks, indicate that the operations performed in said blocks are reverse operations with respect to the ones performed on coding. BCPCM coded sample decoding follows the following relation:

$$\tilde{X}_{(i,j)} = [\tilde{C}_{(i)}/2^{n(i)-1}] \cdot (X_{(i,j)} + 0,5)$$

where
j=1, ..., N and
i=2, ..., 7.

For more information about BCPCM coding and decoding, one should refer to the drawings of U.S. Pat. No. 4,216,354.

For instance, coding can be performed by giving the parameters the following values:
Length of each signal portion providing a sample block: 20 ms
Number of useful sub-bands: p=6
Number of samples per sub-band and block: N=5
Number of bits to be distributed for coding a sample of each of the six sub-bands: M=15
Average number of bits per sample of a sub-band: $<n_{(i)}>$ =M/p=2.5

Figure 5:
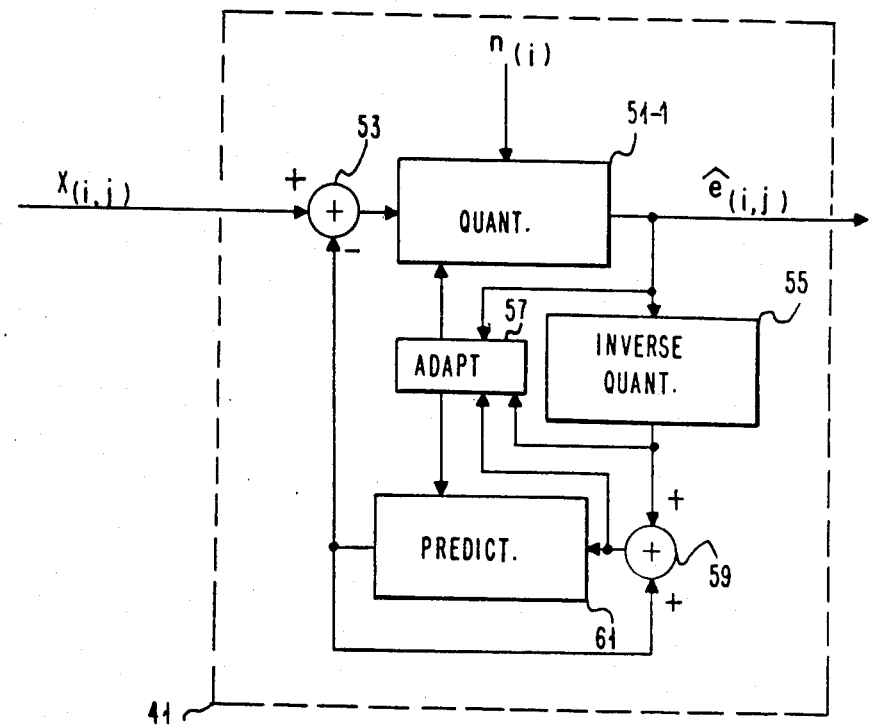
FIGS. 5 to 8 show various embodiments of APC coders and decoders and some of their components to be provided in the devices shown in FIGS. 3 and 4.
Figure 8:
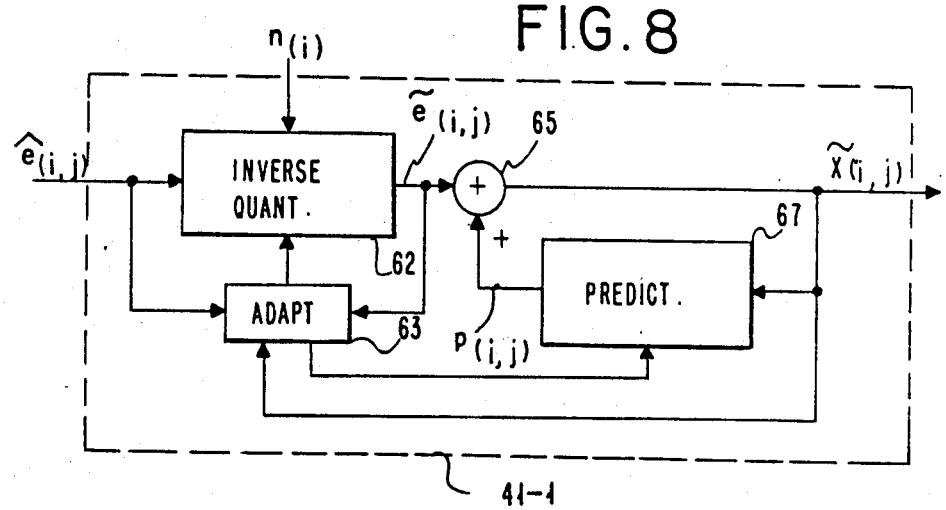

As to adaptive predictive coding and decoding, they are performed according to the block diagrams of FIGS. 5 and 8. For coding, in each sub-band, samples $X_{(i,j)}$ of the signal to be requantized are applied to a quantizer 51-1 through a subtractor 53. The signal issued from quantizer 51-1 is processed in inverse quantizer 55 and in adapt device 57. The output of inverse quantizer 55 is connected to both adapt device 57 and adder 59. The second input of adder 59 is connected to the output of a predictor 61 the input of which is connected to the output of adder 59. The output of adder 59 is also connected to one of the inputs of adapter 57. The output of predictor 61 is also connected to the negative input of subtractor 53. Adapt device 57 provides information allowing quantizer 51-1 and predictor 61 to be adapted.

The operation of the coding device shown on FIG. 5 is based on the sequential adaptive predictive techniques as more especially described in an article by D. COHN and J. MELSA published in the IEEE Trans. On Communications, Vol. COM-23, no. 9, pages 935–941, September 1974, and entitled "The Residual Encoder—An Improved ADPCM System for Speech Digitization". In this case, the predictor coefficients are no longer determined from the knowledge of an entire block of samples as in the autocorrelation method used in the VEPC, but they are adapted on each sampling interval, in accordance with the information obtained from the reconstruction of previously predicted samples. Therefore, sample order index "j" is to be considered independently of the block scheme in which j is limited to N.

FIG. 5 shows that a predicted sample $p_{(i,j)}$ is subtracted in 53 from input sample $X_{(i,j)}$ to give a predicted residual sub-band sample.

$$e_{(i,j)} = X_{(i,j)} - p_{(i,j)} \quad (4)$$

Information $e_{(i,j)}$ is also called a prediction error. Said error, after being quantized in 51-1, provides quantized residual sub-band prediction samples $\hat{e}_{(i,j)}$. Let's first assume that quantizer 51-1 has a determined step for each sample block to be quantized, said step being computed according to term $n_{(i)}$ which is provided by bit dynamic allocation device (DAB) 33 in accordance with the method described in U.S. Pat. No. 4,216,354. Said quantized residual samples $\hat{e}_{(i,j)}$ will constitute the SIGNAL information for the sub-bands in which switch 45 would have been placed on the output of prediction coder APC (see FIG. 4). In addition, samples $\hat{e}_{(i,j)}$ are submitted to an inverse quantizing operation performed in 55 and providing reconstructed sub-band prediction residual samples $\tilde{e}_{(i,j)}$. Terms $\tilde{e}_{(i,j)}$ added to predicted samples $p_{(i,j)}$ provide reconstructed input samples $\tilde{X}_{(i,j)}$. Predicted samples $\tilde{p}_{(i,j)}$ are given by:

$$p_{(i,j)} = \sum_{k=1}^{2} a_{(i,j,k)} \cdot \tilde{X}_{(i,j-k)} \quad (5)$$

$$= a_{(i,j,1)} \cdot \tilde{X}_{(i,j-1)} + a_{(i,j,2)} \cdot \tilde{X}_{(i,j-2)}$$

where $a_{(i,j,k)}$ represents the value of the $k^{th}$ coefficient of predictor 61 on instant j for the $i^{th}$ sub-band. These coefficients are adapted on a sample by sample basis, according to the standard gradient procedure:

$$a_{(i,j+1,k)} = a_{(i,j,k)} - \alpha' \cdot \frac{\partial \tilde{e}^2_{(i,j)}}{\partial a_{(i,j,k)}}$$

It can be shown that:

$$\frac{\partial \tilde{e}^2_{(i,j)}}{\partial a_{(i,j,k)}} = -2 \tilde{X}_{(i,j-k)} \cdot \tilde{e}_{(i,j)}$$

The following choice avoids divisions by too small numbers when the signal energy decreases too much.

$$a_{(i,j+1,k)} = a_{(i,j,k)} + \frac{\alpha \cdot \tilde{X}_{(i,j-k)} \cdot \tilde{e}_{(i,j)}}{\beta + (1-\gamma) \cdot \sum_{l=0}^{\infty} \gamma^l \cdot \tilde{X}^2_{(i,j-l)}} \quad (6)$$

It can be shown that for a pure sine wave of pulsation $\omega$, the predictor coefficients converge towards the following values:

$$a_{(l,j,1)} = 2 \cos \omega T$$

$$a_{(i,j,2)} = -1$$

where T is the signal sampling period.

In the present case in which the sub-band signals are obtained from the analysis of the base band, it appears that the convergence is reached much more quickly by keeping $a_{(i,j,2)} = -1$ and by adapting $a_{(i,j,1)}$ by using relation (6).

In practice, the use of formula (7) given below is recommanded:

$$a_{(i,j+1,l)} = a_{(i,j,l)} + \frac{\alpha \cdot \tilde{X}_{(i,j-l)} \cdot \tilde{e}_{(i,j)}}{\beta + (1-\gamma) S_{(i,j)}} \quad (7)$$

where $$S_{(i,j)} = \gamma S_{(i,j-1)} + \tilde{X}^2_{(i,j)} \quad (8)$$

and where the value obtained for coefficient $a_{(i,j+1,1)}$ is limited to interval $]-2, +2[$ so as to ensure predictor stability.

Coefficient $\alpha$, $\beta$, $\gamma$ are experimentally determined to provide quick convergence of formula (7). The following terms were used:

$\alpha = 0.3$ $\beta = 0.01$ $\gamma = 0.7$

Then, expression (5) can be written as follows:

$$p_{(i,j+1)} = a_{(i,j+1,1)} \cdot \tilde{X}_{(i,j)} - \tilde{X}_{(i,j-1)} \quad (9)$$

Figure 6:
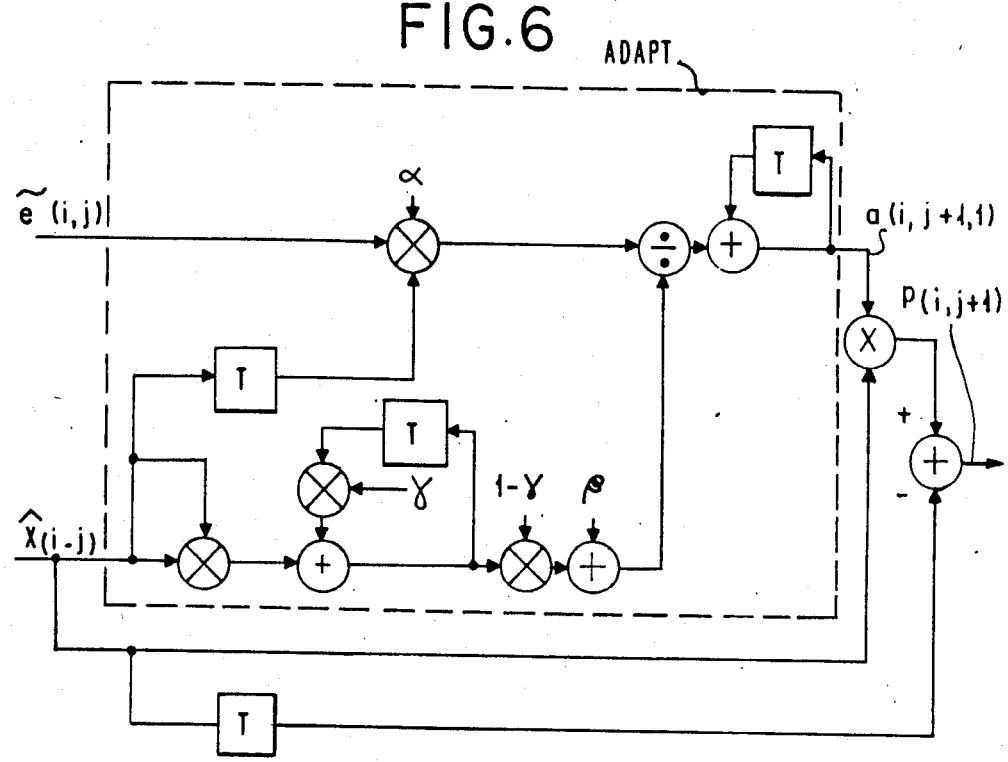

FIG. 6 schematically shows predictor 61 associated to the corresponding portion of adapt device 57. The operation of the predictor follows expressions (7) to (9). The portion of FIG. 6 shown in dotted lines represents the portion of adapter 57 in charge of the adaptation of predictor 61. However, it should be noted that as indicated above, term $a_{(i,j+1,1)}$ should go from the output of device ADAPT, through a circuit (not shown) limiting the values of $a_{(i,j+1,1)}$ to interval $]-2, +2[$. The remaining portion of FIG. 6 belongs directly to predictor 61.

The samples of the sub-band prediction residual signal are quantized by using an adaptive quantizer. From the very principle of differential coding, the quantizing step does not only depend on the number of allocated bits $n_{(i)}$ but also must be adapted with each sample. Said adaptation is recurrently performed by adapter 57. Stated another way, quantizing step $q_{(i,j)}$ of the $i^{th}$ sub-band depends on value $q_{(i,j-1)}$ and on the value of prediction residual sample $\hat{e}_{(i,j-1)}$. Since, in the present case, signal $e_{(i,j)}$ can show important amplitude variations when quick variations are experienced in the frequency of the signal providing samples $X_{(i,j)}$, it is necessary to choose the quantizer adaptation parameters to ensure an adaptation which is not too slow in the case of a 2 to 3 bit quantization.

The following adaptation function has been chosen:

$$q_{(i,j)} = \tfrac{1}{2}[M \cdot q_{(i,j-1)} + q_{(i,j-2)}] \quad (10)$$

where M has a predetermined digital value depending on both the value of term $\hat{e}_{(i,j-1)}$ and the number of allocated bits $n_{(i)}$.

Therefore, adaptation device 57 contains a table (see table I below, for instance) which provides M according to $n_{(i)}$ and $\hat{e}_{(i,j)}$.

TABLE I

| $\hat{e}_{(i,j-1)}$ | $n_{(i)} = 2$ M | $n_{(i)} = 3$ M | $n_{(i)} = 4$ M |
|---|---|---|---|
| 7 | | | 2.0 |

TABLE I-continued

| $\tilde{e}_{(i,j-1)}$ | $n_{(i)} = 2$ M | $n_{(i)} = 3$ M | $n_{(i)} = 4$ M |
|---|---|---|---|
| 6 | | | 1.75 |
| 5 | | | 1.5 |
| 4 | | | 1.25 |
| 3 | | 1.7 | 1.1 |
| 2 | | 1.2 | 0.9 |
| 1 | 1.4 | 0.85 | 0.75 |
| 0 | 0.84 | 0.65 | 0.5 |
| −1 | 0.84 | 0.65 | 0.5 |
| −2 | 1.4 | 0.85 | 0.75 |
| −3 | | 1.2 | 0.9 |
| −4 | | 1.7 | 1.1 |
| −5 | | | 1.25 |
| −6 | | | 1.5 |
| −7 | | | 1.75 |
| −8 | | | 2.0 |

Figure 7:
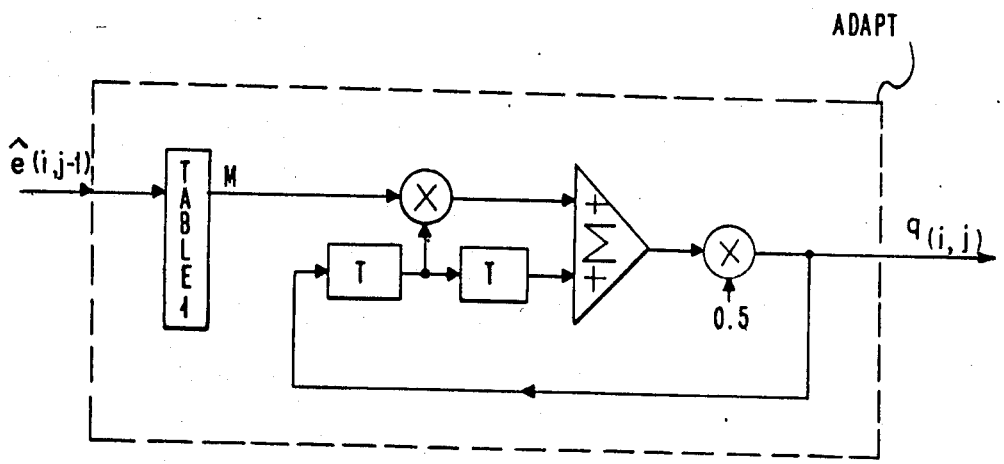

FIG. 7 shows a particular embodiment of a device providing $q_{(i,j)}$ for $n_{(i)}=3$, according to relation (10) and table I.

FIG. 8 shows a decoder 41-1 of the predictive type corresponding to the coder of FIG. 5. Prediction residual samples $\hat{e}_{(i,j)}$ are submitted therein to an inverse quantization operation in 62. The parameters required for performing the inverse quantization operation are provided by both bit dynamic allocation device 33 (see FIG. 2) and adapter 63. The inverse quantizer provides samples $\tilde{e}_{(i,j)}$ which are sent to an adder 65 the output of which provides decoded sub-band signal samples $\tilde{X}_{(i,j)}$. The second input of the adder receives terms $p_{(i,j)}$ provided by predictor 67 the input of which receives terms $\tilde{X}_{(i,j)}$. Devices 63 and 67 are similar to the ones used for the coder of FIG. 5. Adapter 63 is more particularly similar to circuit 57 while predictor 67 is similar to predictor 61.

Figure 9:
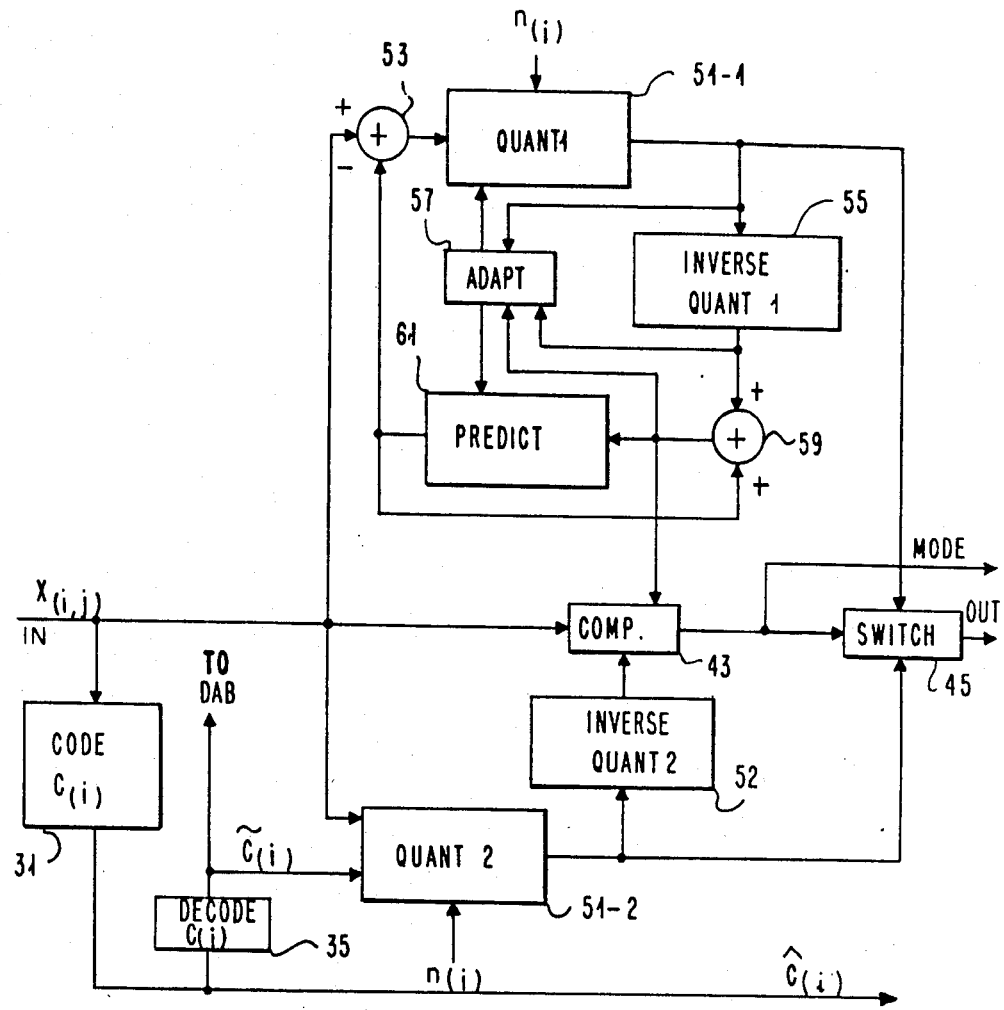
FIGS. 9 and 10 schematically show various embodiments of elements 37 and 37-1 of FIGS. 3 and 4.

FIG 9 is a more detailed diagram of a particular embodiment of the device shown on FIG. 3. Sub-band samples $X_{(i,j)}$ (see FIG. 2) are then simultaneously processed in a coder of the APC type and in a coder of the BCPCM type. The number of bits $n_{(i)}$ to be allocated to the $i^{th}$ sub-band is determined from terms $\tilde{C}_{(i)}$ by using a DAB device (not shown) similar to DAB 33 of FIG. 2. The APC type coder shown in the upper portion of FIG. 9 is comprised of the same elements as the ones described in relation with FIG. 5. Its output provides reconstucted samples $\tilde{X}^{(1)}_{(i,j)}$ to comparator 43.

A coder of the BCPCM type is shown in the lower portion of FIG. 9 and provides comparator 43 with the samples reconstructed in 52, namely $\tilde{X}^{(2)}_{(i,j)}$. Comparator 43 computes for each subband, the distortion value due to each type of coding (APC and BCPCM) and chooses in 45, the best type or mode of coding, i.e. the one providing the smallest distortion. The distortion introduced by each of the coders, is defined as a measurement of the difference existing between original signal $X_{(i,j)}$ and reconstructed signal $X_{(i,j)}$, said measurement being based on the mean quadratic error criterion. A differential distortion term $D_{1,i}$ introduced by the APC coder for each block of samples of sub-band i, is defined by the following relation:

$$D_{1,i} = \sum_{j=1}^{N} [X_{(i,j)} - \tilde{X}^{(1)}_{(i,j)}]^2$$

The direct distortion term $D_{2,i}$ introduced by the BCPCM coder is equal to:

$$D_{2,i} = \sum_{j=1}^{N} [X_{(i,j)} - \tilde{X}^{(2)}_{(i,j)}]^2$$

Comparator 43 compares $D_{1,i}$ and $D_{2,i}$ and if $D_{1,i} < D_{2,i}$, the differential mode is selected. In the other case, the direct mode is chosen.

A so called "mode" bit is associated to the SIGNAL information in order to identify the chosen coder for each sub-band.

Comparator 43 switches device 45 either to the output of quantizer 51-1 associated to the differential type coder (APC) and providing terms $\hat{e}_{(i,j)}$, or to the output of quantizer 51-2 associated to the BCPCM type coder providing terms $\hat{X}_{(i,j)}$. It is also necessary to add characteristic terms $\tilde{C}_{(i)}$ to the SIGNAL information. Finally, the so called mode bit is also incorporated into the SIGNAL information.

Figures 10, 14:
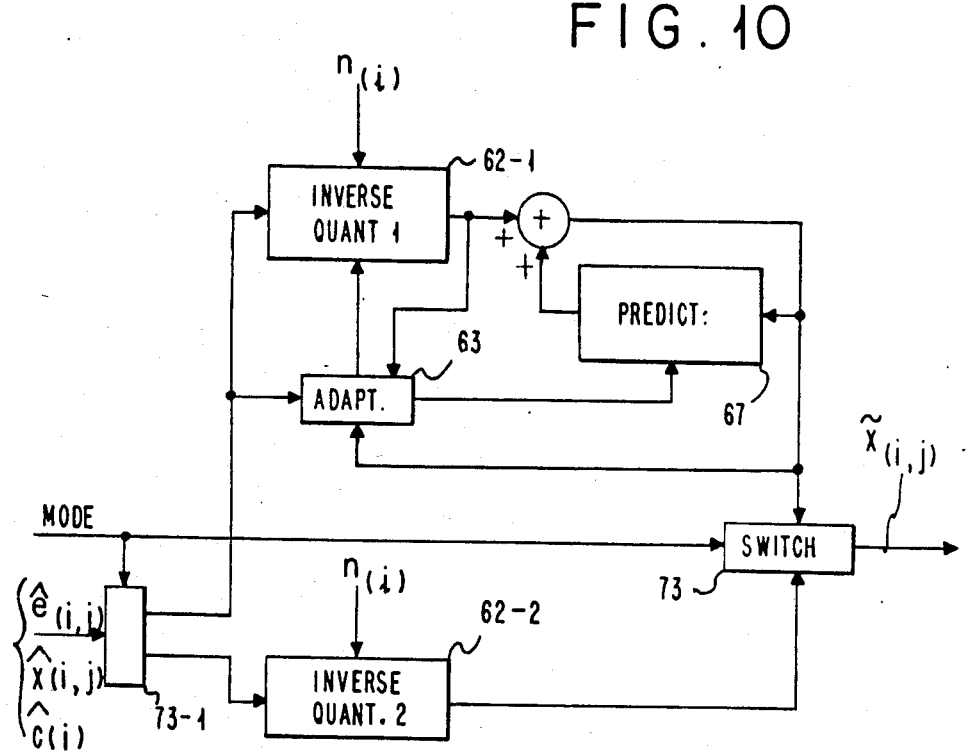
FIG. 14 illustrates an arrangement of the bits obtained at the output of a transmitter according to the invention.

FIG. 10 shows a particular embodiment of a decoder performing the opposite (i.e. decoding) operations to those performed by the device of FIG. 9. This device should be included into decoder 13 of the device of FIG. 1B. The data constituting $\hat{e}_{(i,j)}$, $\hat{X}_{(i,j)}$ and $\hat{C}_{(i)}$ are sent, through a switch 73-1 activated by the MODE bit to one of two inverse quantizers 62-1 and 62-2 the quantization steps of which are dynamically adjusted.

Characteristics terms $\hat{C}_{(i)}$ included in the SIGNAL information, are decoded, then used for recomputing the number of bits $n_{(i)}$ to be allocated to the $i^{th}$ sub-band by using a DAB device (not shown) similar to the one used at the transmitting (coding) end.

Inverse quantizer 62-1 is similar to the one of FIG. 8. Inverse quantizer 62-2 is of the direct type, i.e. it carries out an operation of the following type:

$$\tilde{X}_{(i,j)} = [\tilde{C}_{(i)}/2^{n(i)-1}] \cdot [\hat{X}_{(i,j)} + 0.5] \qquad (11)$$

An output switch 73 is switched either to the decoder of the upper portion or to the one of the lower portion of FIG. 10 according to the value of the so called mode bit.

Figure 11:
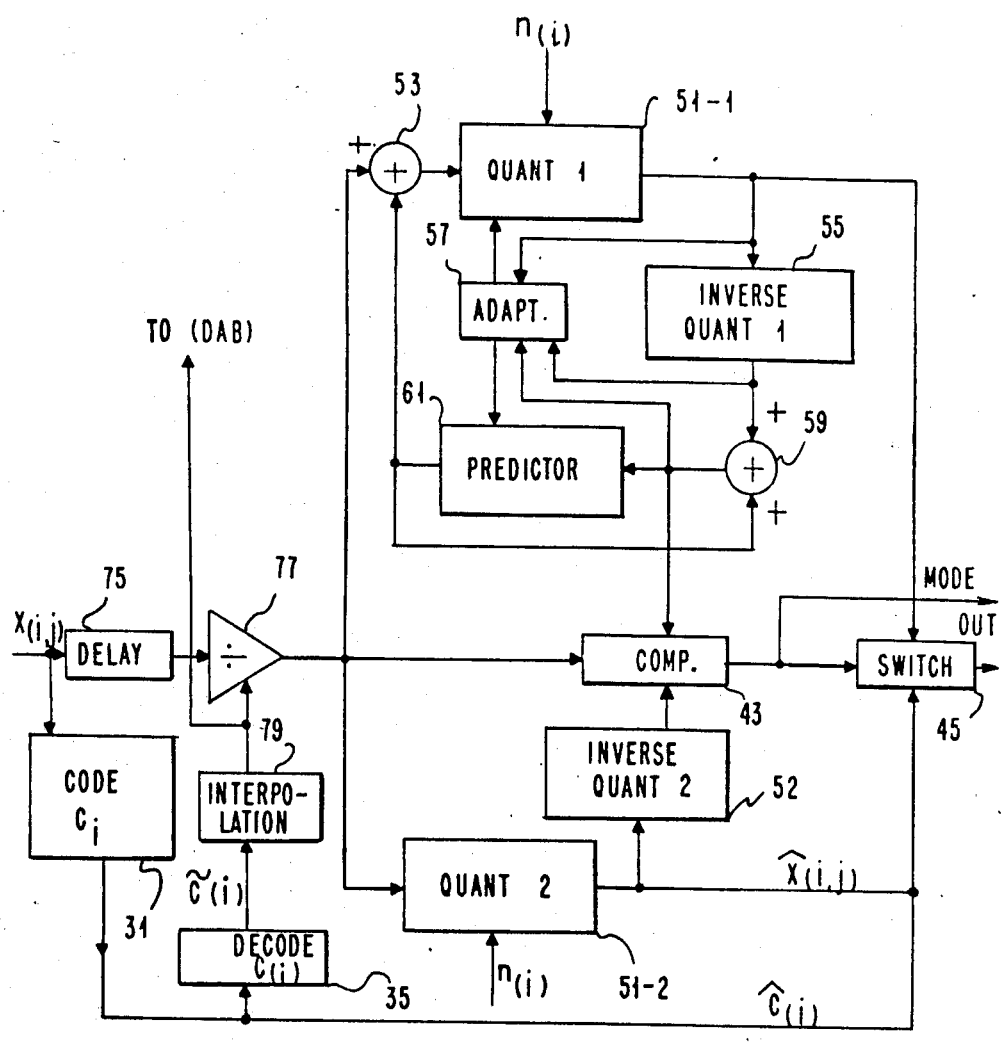
FIGS. 11 and 12 show another embodiment of elements 37 and 37-1.

A good performance of the sub-band coder of this invention has been made possible by the provision of means judiciously using the strong correlations of the signals of certain sub-bands for sounds of the voiced type. Nevertheless, said performance can be even still improved by equalizing the envelope of the processed signals. A priori, it is obvious that said equalizing operation requires the provision of additional means for the coder, said additional means being liable to increase the cost of said coder and to slow its operation down. These disadvantages can be reduced by judiciously using means available in the coder as shown in FIG. 11. This figure is similar to FIG. 9. In addition to the elements shown in FIG. 9 (and provided with the same references), the device of FIG. 11 includes elements (75, 77 and 79) provided for equalizing terms $X_{(i,j)}$ issued from the sub-band signals. Device 75 simply delays samples $X_{(i,j)}$ for compensating for the effects due to the duration of the equalizing operations themselves, which equalizing operations use a divider 77 the division coefficient of which is defined by the envelope of signal $X_{(i,j)}$. A relatively simple means for determining said envelope is used in the present case and consists of a simple linear interpolator 79 of the characteristic coefficients $\tilde{C}_{(i)}$ provided by decoder 35.

Figure 12:
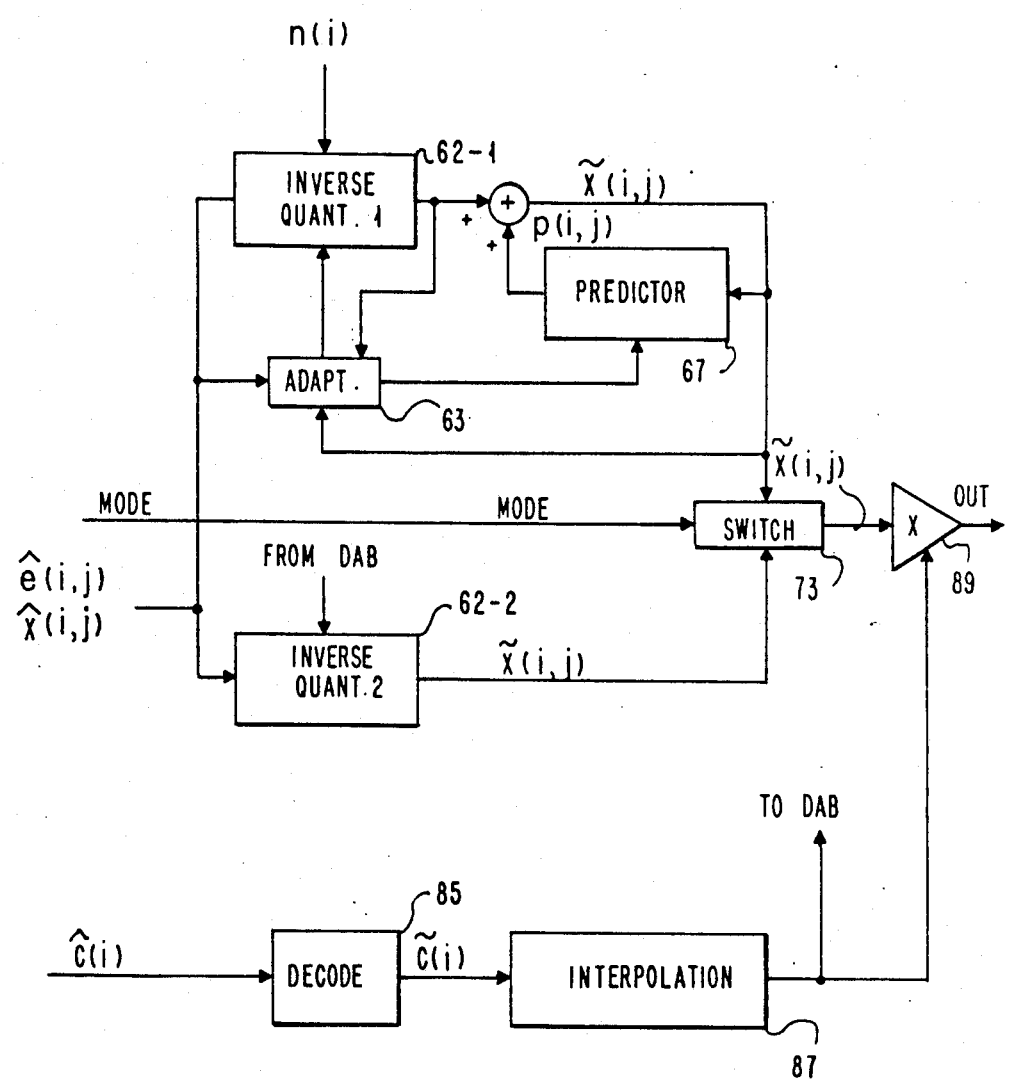

FIG. 12 shows the decoder to be used for carrying out decoding operations when coding has been performed by the device of FIG. 11. Therefore, this decoder is comprised of the same elements as the ones shown on FIG. 10, provided with additional modulation circuits for reconstructing the original signal, i.e. the not-equalized signal. First of all, the modulation circuits reconstruct the envelope of each sub-band signal by decoding characteristics terms $\hat{C}_{(i)}$ in 85 and interpolating decoded terms $\tilde{C}_{(i)}$ in 87 before multiplying decoded samples $\hat{X}_{(i,j)}$ by this envelope by using multiplier 89.

It has been indicated that the coder of this invention permits a better allocation of the quantizing bits by redistributing the bits not used by the quantizers of the sub-bands processed in differential mode (APC) to the sub-bands processed in BCPCM mode. Several techniques can be considered. For instance, the number of bits $n_{(i)}$ allocated to each sub-band processed in APC mode, could be limited to a predetermined value $n_k$; or better, said number $n_{(i)}$ of these sub-bands could be forced to this value. In this case, when number $n_{(i)}$ provided for the $i^{th}$ sub-band by the DAB device exceeds $n_k$, it is forced to this value. On the contrary, when number $n_{(i)}$ of an APC sub-band is lower than $n_k$, the sub-band is switched to the direct coder (BCPCM) and the MODE bit is inverted.

Figure 13:
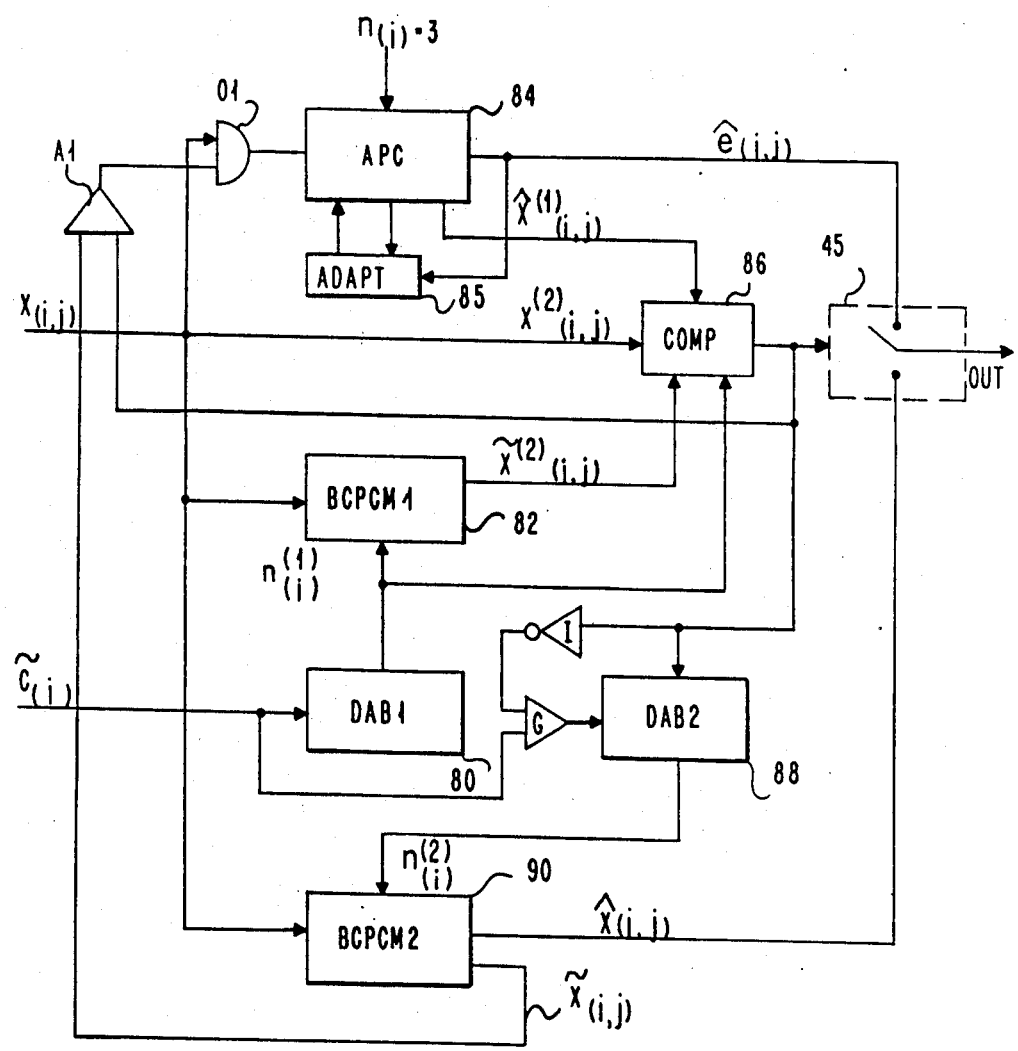
FIG. 13 is a block diagram of another embodiment of the invention.

FIG. 13 is a schematic diagram which can be used for understanding the various steps of the above described coding process. As previously seen and more particularly in relation with FIG. 9, each sample block (corresponding to 20 ms of signal) is sorted in order to extract terms $C_{(i)}$ or more particularly terms $\tilde{C}_{(i)}$ obtained by coding/decoding of terms $C_{(i)}$, therefrom. These terms $\tilde{C}_{(i)}$ are used in a device DAB1, 80, providing terms $n^1_{(i)}$ (index 1 indicates that a 1st processing is considered), for instance, by resolving the following operation:

$$n^1_{(i)} = \frac{1}{6}\left[15 - \sum_{j=2}^{7} \log_2 \tilde{C}_{(j)}\right] + \log_2 \tilde{C}_{(i)}$$

Term $n^1_{(i)}$ adjusts the quantizing step of BCPCM coder 82 assigned to the $i^{th}$ sub-band. Samples $X_{(i,j)}$ requantized in BCPCM1 82 are also differentially coded in APC coder 84 with its adapter 85 to which a fixed number of bits $n_k = 3$ is allocated, i.e. for this type of coding $n_{(i)} = 3$ regardless of the value of i. This is due to the fact that the experience shows that with 3 bits, the best expectable coding gain (asymptotic gain) is obtained.

However, instead of proceeding as indicated in relation with FIG. 9, where a comparator makes a choice from the two coders and switches the device output to the chosen coder, in this case comparator 86 arranges, when necessary, a second passage of samples $X_{(i,j)}$ through the coders by using means (not shown) reallocating quantizing bits saved by the sub-band coders operating in differential mode (APC).

An example will be used to make the understanding of the subsequent operation easier. Let us assume that the first passage through the coders has provided the following information:

| i | 2 | 3 | 4 | 5 | 6 | 7 |
|---|---|---|---|---|---|---|
| bit MODE*(1) | 1 | 1 | 1 | 0 | 0 | 0 |

-continued

| i | 2 | 3 | 4 | 5 | 6 | 7 |
|---|---|---|---|---|---|---|
| $n^1_{(i)}$ | 5 | 2 | 0 | 4 | 3 | 1 |

*1 = the APC coder is chosen
0 = the BCPCM coder is chosen and index (1) indicates that the samples $X_{(i,j)}$ being processed are going through APC coder 84 and BCPCM coder 82 for the first time.

The MODE bit indicates that after having compared the results, the APC coder has been selected for sub-bands 2, 3 and 4 while the BCPCM coder is retained for sub-bands 5, 6 and 7.

But when i=2, the APC coder is used in fact with $n^1_{(2)} = n_k = 3$.

On the other hand, when i=3 and 4, $n_{(i)} < 3$, a BCPCM coding is preferred. The corresponding MODE bit is set to zero.

Stated another way, the group of MODE bits becomes (100000) and is referenced MODE (2) word.

The choice of the APC coder for the 2nd sub-band makes $5 - 3 = 2$ coding bits available. It can be further considered that since the transmission of $C_{(2)}$ is not necessary, the 4 coding bits of $C_{(2)}$ are also available and correspond, after distribution over the N=5 samples of the block, to 0.8 additional bit (4/N). Therefore, $2 + 0.8 = 2.8$ additional bits are to be redistributed on each sampling time between the p'=5 sub-bands for which the MODE$_{(2)}$ bit is equal to zero. The number of quantizing bits available for the second run of terms $X_{(i,j)}$ through the coders of the BCPCM type is, therefore, equal to:

$$M' = M - n_k \cdot p'' + \frac{4p''}{N} = M + \left(\frac{4}{N} - n_k\right) p'' \quad (12)$$

where p'' is equal to the sum of the MODE$_{(2)}$ bits equal to 1, i.e. p''=1 in the above example.

In the preceding example:

$$M' = 15 + \left(\frac{4}{5} - 3\right) p'' = 12.8$$

This calculation can be performed in bit dynamic allocation device 88 referenced DAB2 in FIG. 13. From there DAB2 redefines the bits to be allocated to the BCPCM coders of sub-bands 3, 4, 5, 6 and 7 by applying the following relation:

$$n^{(2)}_{(i)} = \frac{1}{p'}\left[M' - \sum_{j=3}^{7} \log_2 \tilde{C}_{(j)}\right] + \log_2 \tilde{C}_{(i)} \quad (13)$$

$$n^{(2)}_{(i)} = \frac{1}{5}\left[12.8 - \sum_{j=3}^{7} \log_2 \tilde{C}_{(j)}\right] + \log_2 \tilde{C}_{(i)} \quad (14)$$

where i=3, 4, 5, 6, 7 and $p' = p - p'' = 5$ in the preceding example.

It could be also possible to use the methods described in the above indicated patents for redistributing the 2.8 additional bits made available between sub-bands 3 to 7 without any recalculation of the $n_{(i)}^{(2)}$ terms by using formula (14). Of course, it would be necessary to use the same mode for determining the $n_{(i)}^{(2)}$ terms at the receive end.

New terms:
$n_{(3)}^{(2)}$, $n_{(4)}^{(2)}$, $n_{(5)}^{(2)}$, $n_{(6)}^{(2)}$, and $n_{(7)}^{(2)}$
which are obtained, are used for requantizing the samples of sub-bands 3 to 7. The execution of this 2nd coding is shown on FIG. 13 by a second coder BCPCM2, 90. In practice, the same coder will be re-used for performing the BCPCM1 and BCPCM2 functions.

The $X_{(i,j)}$ terms obtained by said second coding are applied to switch 45 controlled by the new 6-bit word (100000) representing the MODE 2 bits while switch 45 receives the $ê_{(i,j)}$ terms from the APC coder. An inverter I and a gate G schematically show the fact that the MODE$_{(2)}$ bits equal to zero limit the effect of device DAB2 to sub-bands 3 to 7.

In addition, it should be noted that, while the differential coders (APC) are not used for certain sub-bands (in the present case i=3 to 7), it is necessary to re-adjust their coefficients $a_{(i,j-1)}$. This readjustment is performed, on the one hand, by re-applying to the delay cells (T) of FIGS. 6 to 7 the information they contained prior to the first run and on the other hand by operating the APC type coder of each sub-band retained to be processed in BCPCM mode on the $\tilde{X}_{(i,j)}$ samples provided by the corresponding BCPCM2 coder. It is to be noted that said $\tilde{X}_{(i,j)}$ terms, which are also available from the decoder (see FIG. 12), can be therefore used in the same way for adjusting adapter 63. It is the reason by the output providing the $\tilde{X}_{(i,j)}$ terms of the BCPCM2 coder has been fedback into the input of the corresponding APC coder. This feedback goes through AND gate A1 controlled by the MODE (2)-bit provided by comparator 86. OR logic circuit 01, located after gate A1 receives through its inputs, either the $\tilde{X}_{(i,j)}$ terms reconstructed in BCPCM2, or the $X_{(i,j)}$ samples.

FIG. 14 schematically shows the format of a block of bits issued from multiplexor 28 (see FIG. 1) for each sample block, representing 20 ms of coded voice signal. First of all, it comprises two words (E1 and E2) of 4 bits each, representing two energy information provided by the ENERG channel at the rate of an information every 10 ms. Then, it comprises the PARCOR coefficients provided by predictor 14 of the COEF channel (a total of 28 bits). Then it comprises the 6 so-called MODE bits (one bit for each sub-band 2 to 7), followed by the sub-band characteristics terms coded in BCPCM mode (4 bits per $\hat{C}_{(i)}$), and finally, the $X_{(i,j)}$ or $ê_{(i,j)}$ samples as the case may be.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. A method for digitally coding a voice signal by submitting said voice signal to a Voice Excited Predictive Coder to derive a residual base band signal therefrom, said residual base band signal being split into sub-band signals which sub-band signals are to be recoded using dynamic quantizing bits allocation methods, said re-coding involving:
   submitting each sub-band signal to both direct Block Companded Pulse Code Modulation (BCPCM) and differential re-coding operations;
   comparing the BCPCM and differentially recoded signals to the non recoded sub-band signal to derive a distortion information therefrom; and,
   selecting for each sub-band, the recoded signal providing the lowest distortion.

2. A method for digitally coding a voice signal as set forth in claim 1 further characterized in that said differential coding is of the Adaptive Predictive Coding (APC) type.

3. A method for digitally coding a voice signal by submitting said voice signal to a Voice Excited Predictive Coder to derive a residual base band signal therefrom, said residual base band signal being split into sub-band signals which sub-band signals are to be individually recoded using dynamic requantizing bit rates allocation methods, said re-coding involving:
   equalizing each sub-band signal;
   submitting each sub-band equalized signal to both direct BCPCM and differential re-coding operations;
   comparing, for each sub-band, the directly and differentially recoded signal to the equalized sub-band signal to derive a distortion information therefrom; and,
   selecting for each sub-band, the recoded signal providing the lowest distortion.

4. A method according to claim 3 wherein said differential re-coding operation is performed using the APC (Adaptive Predictive Coding (APC)) techniques.

5. A digital coding method as set forth in claim 4 wherein said equalizing step comprises the following operations:
   determining the envelope of the signal within each sub-band; and,
   demodulating the signal within each sub-band by using said envelope.

6. A method for digitally coding a voice signal by deriving a residual base band signal therefrom, said residual base band signal being split into sub-band signals which sub-band signals are individually recoded, said re-coding involving:
   equalizing each sub-band signal;
   submitting each equalized signal to both a differential coder and a direct BCPCM coder, which direct coding is performed with dynamically assigned quantizing bit rates;
   comparing for each sub-band the directly and diffentially recoded signal with the equalized sub-band signal to derive a distortion information therefrom;
   selecting for each sub-band, the recoded signal providing the lowest distortion.

7. A voice signal digital coding device of the type including sampling and predictive coding means delivering a residual base band signal, said coding means including:
   a set of filters fed with said residual base-band signal and splitting said residual base band signal into p sub-band signals;
   analysis means connected to said set of filters and splitting the signal of each sub-band into segments of predetermined duration, each segment containing a block of samples, each block being then processed for deriving a so-called sub-band BCPCM characteristic term therefrom;
   dynamic bit allocating means connected to said analysis means and providing the number of bits to be allocated to the quantization of the sample block contained in each sub-band;

direct re-coding means connected to said set of filters for re-coding the samples of each sub-band;

differential re-coding means connected to said set of filters for re-coding the signal of each sub-band according to the so-called predictive coding techniques;

comparing means connected to said set of filters and to said direct and differential coding means for computing direct and differential distortion values provided by said re-coding of each sub-band signal; and, switching means connected to said re-coding means and to said comparing means within each sub-band for selecting the recoded sub-band signal which is to be fed to the output of said voice signal coding device.

8. A digital coding device as set forth in claim 7 wherein said direct re-coding means use the so-called BCPCM type techniques.

9. A digital coding device as set forth in claim 8 wherein said differential re-coding means use the so-called APC type coding techniques.

10. A digital coding device as set forth in claim 9 wherein said predictive coding means use a predetermined and fixed number of quantizing bits.

11. A digital coding device as set forth in claim 10 and further including:

re-allocating means connected to said comparing means and evaluating the number of quantizing bits allocated by the dynamic bit allocating means and not used by the sub-bands selected for being coded in differential mode and therefore, available;

second dynamic bit allocating means reallocating said available bits between the sub-bands selected for carrying out a direct type coding; and, requantizing means connected to said second dynamic bit allocating means and to said set of filters and carrying out a second requantization of the samples of the sub-bands selected for executing a direct type coding;

whereby the coded segment of signal thus submitted to a second requantization is applied to said switching means.

* * * * *